US009977427B2

(12) United States Patent
Duda et al.

(10) Patent No.: US 9,977,427 B2
(45) Date of Patent: May 22, 2018

(54) SYSTEM AND METHOD FOR ASSISTED EXTRAVEHICULAR ACTIVITY SELF-RETURN

(71) Applicant: THE CHARLES STARK DRAPER LABORATORY, INC., Cambridge, MA (US)

(72) Inventors: Kevin R. Duda, Wayland, MA (US); Richard W. Loffi, Houston, TX (US); Patrick Mark Handley, Cambridge, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 0 days. days.

(21) Appl. No.: 15/164,264

(22) Filed: May 25, 2016

(65) Prior Publication Data

US 2017/0192425 A1    Jul. 6, 2017

Related U.S. Application Data

(60) Provisional application No. 62/275,029, filed on Jan. 5, 2016.

(51) Int. Cl.
*G05D 1/00* (2006.01)
*B64G 6/00* (2006.01)
(Continued)

(52) U.S. Cl.
CPC ............ *G05D 1/0061* (2013.01); *B64G 1/24* (2013.01); *B64G 1/288* (2013.01); *B64G 1/36* (2013.01);
(Continued)

(58) Field of Classification Search
CPC ... B64G 1/40; B64G 1/60; B64G 4/00; G05D 1/0061; G01C 21/165; G01C 21/18
See application file for complete search history.

(56) References Cited

U.S. PATENT DOCUMENTS 3,558,079 A * 1/1971 Curriston ................. B64G 1/16
                                                        244/171.1
5,177,686 A * 1/1993 Boinghoff ............. G01S 3/7867
                                                        250/203.6
(Continued)

OTHER PUBLICATIONS

Zumbado et al., Hands-Free Control Interfaces for an Extra Vehicular Jetpack, Aerospace Conference, 2013 IEEE, dated Mar. 2-9, 2013.*
(Continued)

*Primary Examiner* — Aaron L Troost
(74) *Attorney, Agent, or Firm* — Lando & Anastasi, LLP

(57) ABSTRACT

A system and method for assisted EVA self-return is provided herein. The system estimates a crewmember's navigation state relative to a fixed location, for example on an accompanying orbiting spacecraft, and computes a guidance trajectory for returning the crewmember to that fixed location. The system may account for safety and clearance requirements while computing the guidance trajectory. According to at least one embodiment, the system actuates the crewmember's safety jetpack to follow the prescribed trajectory to the fixed location. In another embodiment, the system provides the crewmember with a directional cue (e.g., a visual, auditory, or tactile cue) corresponding to the prescribed trajectory back to the fixed location. The system may be activated by the crewmember or remotely by another crewmember and/or system.

17 Claims, 3 Drawing Sheets

(51) Int. Cl.
 G01C 21/18 (2006.01)
 G01C 21/16 (2006.01)
 B64G 1/24 (2006.01)
 B64G 1/28 (2006.01)
 B64G 1/36 (2006.01)
 B64G 1/26 (2006.01)
 B64G 1/64 (2006.01)

(52) U.S. Cl.
 CPC ............... B64G 1/361 (2013.01); B64G 6/00 (2013.01); G01C 21/165 (2013.01); G01C 21/18 (2013.01); B64G 1/26 (2013.01); B64G 1/648 (2013.01)

(56) References Cited

U.S. PATENT DOCUMENTS

| | | | | |
|---|---|---|---|---|
| 6,089,507 | A * | 7/2000 | Parvez | B64G 1/1085 244/158.8 |
| 7,216,036 | B2 | 5/2007 | Brady et al. | |
| 8,412,391 | B2 * | 4/2013 | Paluszek | B64G 1/242 244/164 |
| 2002/0030142 | A1 * | 3/2002 | James | B64C 29/0025 244/194 |
| 2011/0234373 | A1 * | 9/2011 | McBain | B64D 45/0015 340/5.82 |
| 2017/0010098 | A1 * | 1/2017 | Georgy | G01S 19/42 |

OTHER PUBLICATIONS

Merkel, A Navigation and Control System for an Autonomous Rescue Vehicle in the Space Station Environment, https://web.archive.org/web/20150216204624/https://ntrs.nasa.gov/archive/nasa/casi.ntrs.nasa.gov/19930013100.pdf, Feb. 2015.*

Wikipedia, Delta-v Budget, https://web.archive.org/web/20130719215629/https://en.wikipedia.org/wiki/Delta-v_budget, Jul. 2013.*

* cited by examiner

SYSTEM AND METHOD FOR ASSISTED EXTRAVEHICULAR ACTIVITY SELF-RETURN

CROSS REFERENCE TO RELATED APPLICATION

This application claims priority to U.S. Provisional Application Ser. No. 62/275,029 entitled "Automatic On-Orbit Return of an Extravehicular Activity (EVA) Crewmember to an Orbiting Vehicle," filed on Jan. 5, 2016, which is incorporated herein by reference in its entirety.

FIELD

At least some embodiments described herein relate generally to Extravehicular Activity (EVA) based systems.

BACKGROUND

EVA includes actions, for example a spacewalk, performed by a crew member outside of a spacecraft. Such an EVA may be performed to conduct repairs and/or maintenance, perform research related activity, or other activity that requires a crewmember to volitionally exit the spacecraft. During EVA, the crewmember is reliant on a spacesuit, for example an Extravehicular Mobility Unit (EMU), such as that manufactured by UTC Aerospace Systems of Charlotte, N.C., and ILC Dover of Frederica, Del., for environmental protection, mobility, life support, and communications.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

SUMMARY

Figure 1:
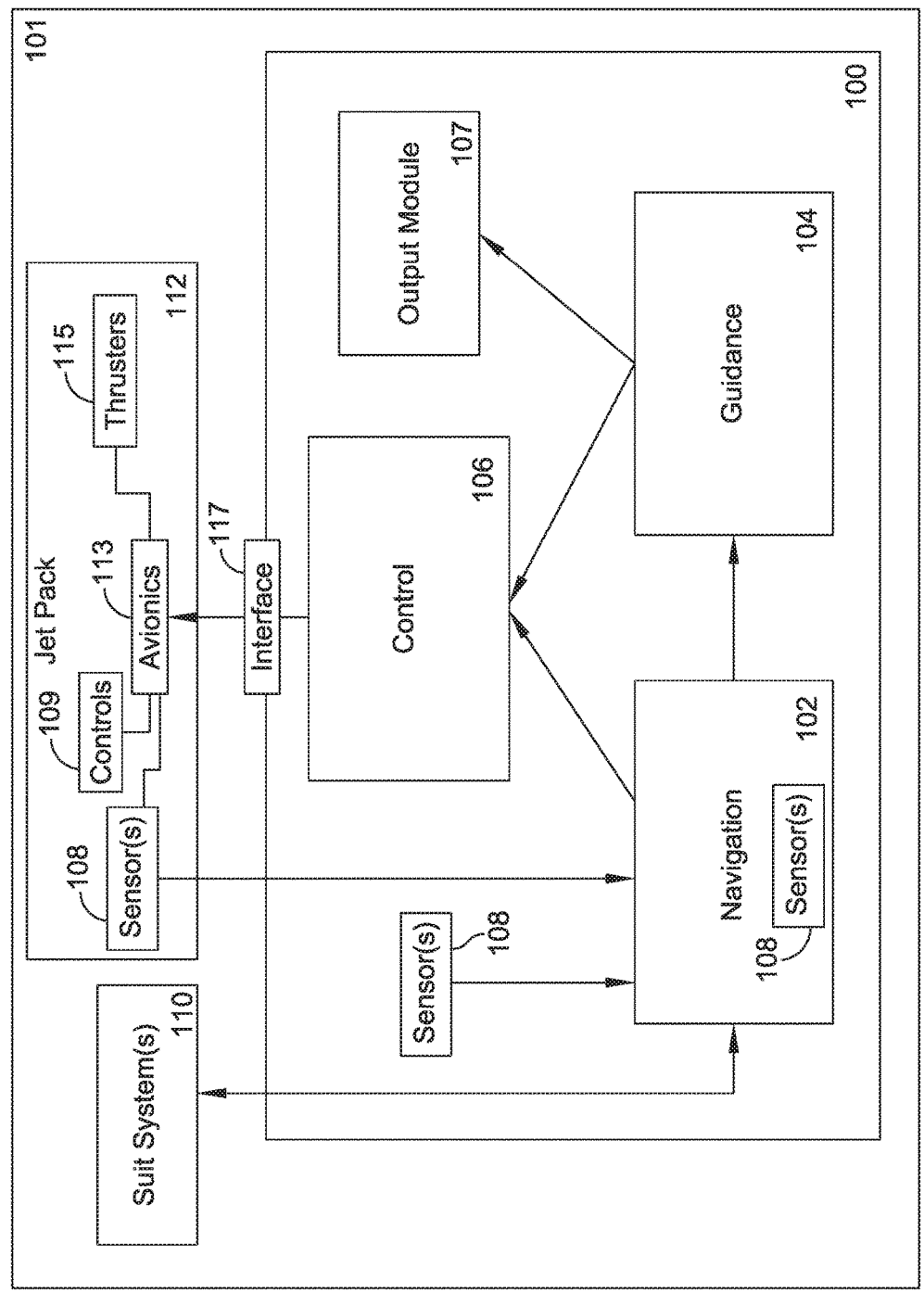
FIG. 1 is a block diagram of an embodiment of an EVA self-return system.

A system and method for assisted EVA self-return is provided herein. The system estimates a crewmember's navigation state relative to a fixed location, for example on an accompanying orbiting spacecraft, and computes a guidance trajectory for returning the crewmember to that fixed location while accounting for safety and clearance requirements. According to at least one embodiment, the system actuates the crewmember's safety jetpack to follow the prescribed trajectory to the fixed location. In another embodiment, the system provides the crewmember with a directional cue (e.g., a visual, auditory, or tactile cue) corresponding to the prescribed trajectory back to the fixed location. The system may be activated by the crewmember or remotely by another crewmember and/or system.

According to one aspect described herein, an EVA self-return system is provided, the EVA self-return system comprising a sensor configured to monitor a parameter of a suit, a navigation module in communication with the sensor, the navigation module configured to identify, based on parameter information received from the sensor, a current location of the suit in relation to a fixed reference point, a guidance module in communication with the navigation module, the guidance module configured to receive, in a self-return mode of operation, an indication of the current location of the suit from the navigation module and to compute, in the self-return mode of operation, a trajectory from the current location of the suit to the fixed reference point, an interface configured to be in communication with a propulsive system, and a control module in communication with the guidance module and configured to be in communication with the propulsive system via the interface, the control module further configured to transmit, in the self-return mode of operation, instructions to the propulsive system to operate the propulsive system to propel the suit to the fixed reference point along the trajectory received from the guidance module. In one embodiment, the propulsive system is a Simplified Aid for EVA Rescue (SAFER) system and the control module is further configured to transmit, in the self-return mode of operation, the instructions to the SAFER system via the interface.

According to one embodiment, the sensor comprises a gyroscope configured to monitor angular movement of the suit. In another embodiment, the sensor comprises an accelerometer configured to monitor linear acceleration of the suit. In one embodiment, the sensor comprises a vision+inertial sensor configured to measure angular movement of the suit, measure linear acceleration of the suit, capture visual images within a field of view of the vision+inertial sensor, and compensate the measured angular movement of the suit and the measured linear acceleration of the suit for drift based on the captured visual images. In another embodiment, the sensor comprises a Global Positioning System (GPS) device configured to communicate with satellites within a line of sight of the GPS device and determine a relative position of the suit based on the communication with the satellites. In one embodiment, the sensor comprises a Wi-Fi positioning system (WPS) configured to determine a relative position of the suit based on communication with a wireless access point. In another embodiment, the sensor comprises a star tracker system configured to capture visual images of objects within a field of view of the star tracker system, compare the captured visual images of the objects to images of the objects previously stored in a database, and determine a relative position of the suit based on the comparison of the captured visual images of the objects to the previously stored images of the objects.

According to another embodiment, the navigation module is in further communication with a suit system and is configured to initiate the self-return mode of operation in response to receiving a signal from the suit system. In one embodiment, the suit system is a user control system and the navigation module is further configured to initiate the self-return mode of operation in response to receiving the signal from the user control system. In another embodiment, the suit system is a communications system and the navigation module is further configured to initiate the self-return mode of operation in response to receiving the signal from the communications system. In one embodiment, the suit system is a biomedical monitoring system and the navigation module is further configured to initiate the self-return mode of operation in response to receiving the signal from the biomedical monitoring system.

According to one embodiment, the navigation module is in further communication with the control module and is further configured to determine, in the self-return mode, based on the parameter information received from the sensor, whether the suit is tumbling at a rotation rate, and in response to determining that the suit is tumbling at the rotation rate, instruct the control module to transmit instructions to the propulsive system that are configured to operate the propulsive system such that the rotation rate is nulled.

According to another embodiment, in computing the trajectory from the current location of the suit to the fixed reference point, the guidance module is further configured to account for a predefined constraint. In one embodiment, the predefined constraint includes at least one of a volumetric envelope of the suit, a safety requirement, an external clearance requirement, and a geometry of a vehicle including the fixed reference point.

According to one embodiment, in computing the trajectory from the current location of the suit to the fixed reference point, the guidance module is further configured to account for a dynamic variable. In one embodiment, the dynamic variable includes at least one of a remaining amount of fuel in the propulsive system and a remaining amount of oxygen in the suit.

Another aspect described herein is directed to a method for EVA self-return, the method comprising monitoring a parameter of a suit, continuously identifying, with a navigation module based on the monitored parameter information, a current location of the suit in relation to the fixed reference point, initiating, in response to receiving a signal from a suit system, a self-return mode of operation, computing, in the self-return mode of operation with a guidance module, a trajectory from the current location of the suit to the fixed reference point, and transmitting, in the self-return mode of operation with a control module, instructions to a propulsive system coupled to the suit, the instructions configured to operate the propulsive system to propel the suit to the fixed reference point along the trajectory received from the guidance module.

According to one embodiment, the method further comprises determining, in the self-return mode of operation with the navigation module based on the monitored parameter information, whether the suit is tumbling at a rotation rate, and in response to determining that the suit is tumbling at the rotation rate, instructing the propulsive system to operate such that the rotation rate is nulled. In another embodiment, computing the trajectory includes computing the trajectory from the current location of the suit to the fixed reference point while accounting for at least one predefined constraint.

At least one aspect described herein is directed to a self-return system comprising a sensor configured to monitor a parameter of a suit, a navigation module in communication with the sensor, the navigation module configured to identify, based on parameter information received from the sensor, a current location of the suit in relation to a fixed reference point, a guidance module in communication with the navigation module, the guidance module configured to receive, in a self-return mode of operation, an indication of the current location of the suit from the navigation module and to compute, in the self-return mode of operation, a trajectory from the current location of the suit to the fixed reference point, and an output module in communication with the guidance module and configured to receive, in the self-return mode of operation, the trajectory from the guidance module and to provide, in the self-return mode of operation, a directional cue identifying a direction in which the suit should be propelled such that the suit is returned to the fixed reference point along the computed trajectory.

According to one embodiment, the directional cue provided by the output module is one of a visual cue, an auditory cue, and a tactile cue. In one embodiment, the output module comprises a display device and is configured to display, in the self-return mode of operation, a visual cue identifying the direction in which the suit should be propelled such that the suit is returned to the fixed reference point along the computed trajectory.

According to another embodiment, the sensor comprises at least one of a gyroscope configured to monitor angular movement of the suit and an accelerometer configured to monitor linear acceleration of the suit. In one embodiment, the sensor comprises at least one of a vision+inertial sensor, a start tracker system, a Global Positioning System (GPS) device, and a Wi-Fi positioning system (WPS). In another embodiment, in computing the trajectory from the current location of the suit to the fixed reference point, the guidance module is further configured to account for at least predefined constraint.

Another aspect described herein is directed to a method for EVA self-return, the method comprising monitoring a parameter of a suit, continuously identifying, with a navigation module based on the monitored parameter information, a current location of the suit in relation to the fixed reference point, initiating, in response to receiving a signal from a suit system, a self-return mode of operation, computing, in the self-return mode of operation with a guidance module, a trajectory from the current location of the suit to the fixed reference point, and providing, in the self-return mode of operation with an output module, a directional cue identifying a direction in which the suit should be propelled such that the suit is returned to the fixed reference point along the computed trajectory.

According to one embodiment, computing the trajectory includes computing the trajectory from the current location of the suit to the fixed reference point while accounting for at least one predefined constraint.

DETAILED DESCRIPTION

As described above, an EVA may be undertaken by a crewmember of a spacecraft for a variety of reasons. During an EVA, due to the lack of gravity during orbital spaceflight, it is important for the location of the crewmember to be closely controlled so that the crewmember does not lose contact with the spacecraft. It is common practice during an EVA for the crewmember to be purposefully attached to the spacecraft. In a typical configuration, the crewmember is attached to the spacecraft with one or more detachable tethers, for example a steel cable, a strap, etc.

If a conventional tether was to fail and the crewmember became separated from the spacecraft, the crewmember may not be able to return to the spacecraft. Some crewmembers are equipped with a self-contained, propulsive backpack system, for example a jet pack, during an EVA. If a crewmember wearing such a jet pack system were to drift away from the spacecraft, the crewmember could operate the jet pack system to propel, for example via jet thrusters, the crewmember back to the spacecraft. A propulsive backpack system may also be used in a non-emergency situation to assist a crewmember in achieving a desired movement or position. Propulsive backpack systems are commonly used in conjunction with a tether, or some other system that mechanically couples to the spacecraft, as an added layer of protection.

While propulsive backpack systems allow a crewmember to propel a spacesuit in a desired direction, typical propulsive backpack systems must be controlled manually, for example via hand controls. If the crewmember was to become incapacitated, for example unconscious, or disoriented, for example unable to identify the correct direction to return the crewmember to the spacecraft, the crewmember may not be able to safely return to the spacecraft, either by use of the jetpack or by traditional movement techniques. Also, even if the crewmember is able to operate the jet pack system, successful operation of the jet pack system to return the crewmember to the spacecraft is a difficult task.

A system and method for assisted EVA self-return is provided herein. The system automatically estimates a crewmembers navigation state relative to a fixed location, for example on an accompanying orbiting spacecraft, and computes a guidance trajectory for returning the crewmember to that fixed location. In at least one embodiment, the system actuates the crewmember's safety jetpack to follow the prescribed trajectory to the fixed location. The system may be activated by the crewmember or remotely, for example by another crewmember located in the spacecraft. In another embodiment, the system provides the crewmember with a directional cue (e.g., a visual, auditory, or tactile cue) corresponding to the prescribed trajectory back to the fixed location.

FIG. 1 is a block diagram of an assisted EVA self-return system 100 according to at least one embodiment described herein. The EVA self-return system 100 is configured to be coupled to a spacesuit 101. For example, in one embodiment, the EVA self-return system 100 is coupled to an EMU manufactured by UTC Aerospace Systems of Charlotte, N.C. and ILC Dover of Frederica, Del.; however, in other embodiments, the EVA self-return system 100 may be coupled to another self-contained suit. The spacesuit 101 is also coupled to a propulsive backpack system 112. In one embodiment, the propulsive backpack system 112 is a Simplified Aid for EVA Rescue (SAFER) system developed by the National Aeronautics and Space Administration (NASA). In another embodiment, the propulsive backpack system 112 is a Manned Maneuvering Unit (MMU) developed by NASA. However, in other embodiments, the propulsive backpack system 112 may be another backpack system that is capable of propelling the spacesuit 101 in a desired direction. The propulsive backpack system 112 includes an avionics control module 113 and thrusters 115, for example cold gas thrusters such as a nitrogen based thrusters, that are operated by the avionics sub-system 113 and configured to expel pressurized gas so that the backpack system 112 and corresponding space suit 101 are propelled in a desired direction. In at least one embodiment, the propulsive backpack system 112 also includes controls 109, for example hand controls, that are configured to be operated by a crewmember and provide signals to the avionics sub-system 113 response to input by the crewmember. The avionics module 113 is configured to operate the thrusters 115, for example to propel the suit 101 in a direction indicated by the operation of the controls 109, in response to the signals received from the controls 109.

The EVA self-return system 100 includes a navigation module 102, a guidance module 104, and a control module 106. The navigation module 102 is configured to communicate with the guidance module 104, the control module 106, and at least one sensor 108. In one embodiment, a sensor 108 is located within the navigation module 102; however, in other embodiments, a sensor 108 may be located at another location within the system 100. According to one embodiment, the navigation module 102 is also configured to communicate with a sensor 108 located in the propulsive backpack system 112 that is coupled to the spacesuit 101. The sensor(s) 108 in communication with the navigation module 102 may include any appropriate sensor, for example a gyroscope, an accelerometer, a camera system, a star tracker system, a Global Positioning System (GPS) receiver, an Inertial Measurement Unit (IMU), etc.

According to a least one embodiment, the EVA self-return system 100 also includes an output module 107. As shown in FIG. 1, the output module 107 is configured to communicate with the guidance module 104; however, the output module 107 may also be configured to communicate with the navigation module 102, the control module 106, the suit systems 110, and/or the propulsive backpack system 112. In one embodiment, the output module 107 is a display device configured to display a visual cue; however, in other embodiments, the output module 107 may be another type of module, for example an auditory output device configured to provide an audible cue or a tactile output device configured to provide a tactile cue.

The navigation module 102 is also configured to communicate with one or more systems 110 of the spacesuit 101. For example, in one embodiment, the navigation module 102 is configured to communicate with a control system 110 of the spacesuit 101. In other embodiments, the navigation module 102 is configured to communicate with other suit systems 110 such as a communications system of the spacesuit 101, user controls of the spacesuit 101/propulsive backpack system 112, the life support system of the spacesuit 101, a biomedical monitoring system of the spacesuit 101, or any system or subsystem included in the spacesuit 101/propulsive backpack system 112.

The guidance module 104 is configured to communicate with the navigation module 102 and the control module 106. The control module 106 is configured to communicate with the navigation module 102 and the guidance module 104. The control module 106 is also configured to communicate with the avionics sub-system 113 of the propulsive backpack system 112 via an interface 117. According to one embodiment, the self-return system 100 and the propulsive backpack system 112 are integrated into the same system. In such an embodiment, the avionics sub-system 113 of the propulsive backpack system 112 and the control module 106 of the self-return system 100 communicate via a software-based interface 117, for example an Application Programming Interface (API). In another embodiment where the self-return system 100 and the propulsive backpack system 112 are two separate systems, the avionics sub-system 113 of the propulsive backpack system 112 and the control module 106 of the self-return system 100 communicate via an interface 117 that includes both a hardware-based interface, for example a parallel or serial based interface including physical connectors, and a software-based interface. Operation of the system 100 is discussed in greater detail below with respect to FIG. 2.

Figure 2:
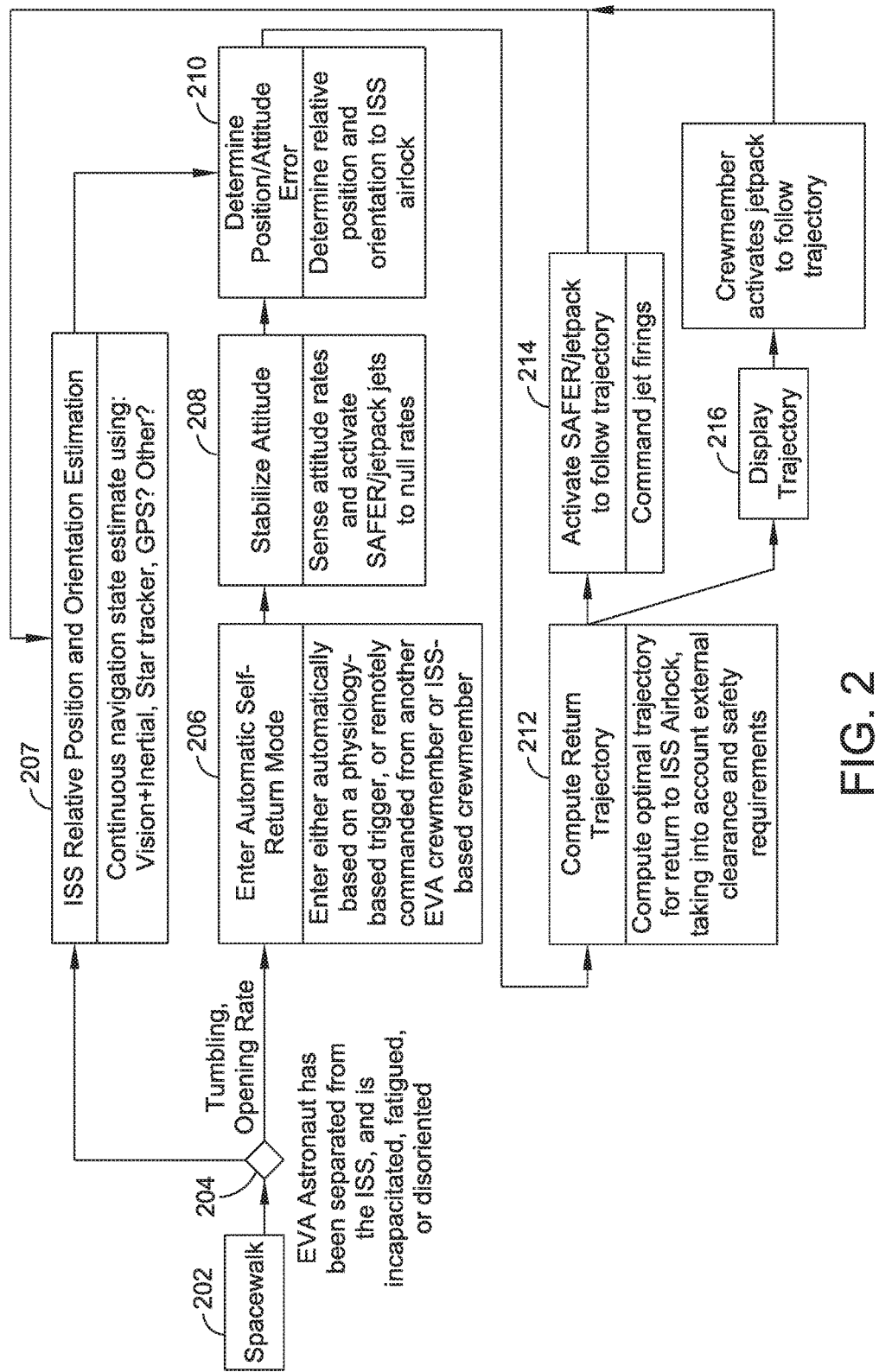
FIG. 2 is a flow chart illustrating operation of an embodiment of an EVA self-return system.

FIG. 2 is a flow chart 200 illustrating operation of the system 100 according to at least one embodiment. At block 202, a crewmember is performing a spacewalk, for example outside of the International Space Station (ISS) or some other spacecraft. The crewmember may be tethered to the spacecraft, coupled to the spacecraft by another mechanical system, or be uncoupled from the spacecraft and floating free. At block 204, the crewmember becomes incapacitated, fatigued, or disoriented. In one example, the crewmember may be unable to manually operate the jet pack 112 to return to the spacecraft, for example because of a mechanical error or because of disorientation. In another example, the crewmember may actually be unconscious.

At block 206, the system 100 enters "Self-Return" mode. According to one embodiment, the system 100 enters "Self-Return" mode in response to direct input by the incapacitated crewmember. For example, the crewmember may press a button on the user control system 110 of the spacesuit 101 that, when pressed, operates the user control system 110 to send a signal to the navigation module 102 to force the system 100 into "Self-Return" mode.

In another embodiment, the system 100 enters "Self-Return" mode in response to input by a remote crewmember and/or system. For example, a second crewmember performing an EVA or located inside an adjacent spacecraft may transmit a signal to the spacesuit 101 of a first crewmember in response to identifying that the first crewmember is incapacitated. The spacesuit 101 receives the signal from the second crewmember via its communications system 110 and the signal operates the communication system 110 (and/or a corresponding control system) to send a signal to the navigation module 102 to force the system 100 into "Self-Return" mode. In another embodiment, a biomedical monitoring system 110 of the spacesuit 101 may identify (based on monitored physiological parameters of a crewmember) when the crewmember has become incapacitated. The biomedical monitoring system 110 (and/or a corresponding control system) sends a signal to the navigation module 102 to force the system 100 into "Self-Return" mode in response to identifying that the crewmember has become incapacitated.

At block 207, the navigation module 102 identifies the position of the spacesuit 101 in relation to a fixed reference point, for example the airlock of the corresponding spacecraft an established coordinate system of the corresponding spacecraft, utilizing the sensors 108 that are in communication with the navigation module 102. According to one embodiment, the fixed reference point is pre-programmed into the navigation module 102. In another embodiment, the fixed reference point is uploaded to the navigation module 102, for example via a communication system 110 of the suit, during an EVA.

The navigation module 102 may utilize one or more different sensors 108 that monitor one or more different parameters of the spacesuit 101, to compute and identify the position of the spacesuit 101 relative to the fixed location. For example, in one embodiment, the navigation module 102 includes (or is in communication with) a vision+inertial sensor 108. According to one embodiment, the vision+inertial sensor 108 includes an Inertial Measurement Unit (IMU) and a stereoscopic or monocular camera system. The IMU includes an accelerometer that is configured to generate information regarding the linear acceleration of the spacesuit 101 and a rate gyroscope that is configured to generate information regarding the angular movement of the spacesuit 101. The camera system of the vision+inertial sensor 108 is configured to periodically capture images within a field of view of the camera system and the vision+inertial sensor 108 is configured to compensate the position and attitude information from the IMU for drift based on the images captured by the camera system. The navigation module 102 is configured to calculate the location of the spacesuit 101 in relation to the fixed reference point based on the information received from the vision+inertial sensor 108. According to other embodiments, the vision+inertial sensor 108 and/or IMU may be configured differently.

According to one embodiment, the navigation module 102 includes (or is in communication with) a star tracker system 108. The star tracker system 108 includes a camera system (including one or more cameras) that is configured to capture images of stars within a field of view of the camera system and compare the captured images of the stars to star images previously stored in a database. The star tracker system 108 identifies the position of the spacesuit 101 in space in relation to the viewed stars based on the comparison between the captured images and the previously stored images. The navigation module 102 determines the location of the spacesuit in relation to a fixed reference point on the corresponding spacecraft by utilizing the information received from the star tracker system 108. According to one embodiment, the navigation module 102 includes (or is in communication with) an Inertial Stellar Compass (ISC) 108 developed by The Charles Stark Draper Laboratory, Inc. of Cambridge, Mass. The ISC 108 includes a star tracker system (as discussed above) and at least one MicroElectro-Mechanical System (MEMS) IMU. The ISC 108 can provide the navigation module 102 with accurate information regarding the relative location of the spacesuit 101 based on the information from both the star tracker system and the MEMS IMU. The navigation module 102 determines the location of the spacesuit 101 in relation to a fixed reference point on the corresponding spacecraft by utilizing the information received from the ISC 108. For example, according to at least one embodiment, the navigation module 102 includes an ISC 108 as described in U.S. Pat. No. 7,216,036, which is herein incorporated by reference in its entirety. According to one embodiment, the star tracker system in the ISC 108 is a miniature star tracker system; however, in other embodiments, any type of star tracker system may be utilized.

According to one embodiment, the navigation module 102 includes (or is in communication with) a Celestial Orbital Sighting System (COSS) 108. The COSS 108 includes multiple star tracker systems (as discussed above) and is configured to capture images of satellites within fields of view of the star tracker systems and compare the captured images of the satellites to satellite images previously stored in a database. The COSS 108 identifies the position of the spacesuit 101 in space in relation to the viewed satellites based on the comparison between the captured images and the previously stored images. The navigation module 102 determines the location of the spacesuit 101 in relation to a fixed reference point on the corresponding spacecraft by utilizing the information received from the COSS 108.

According to one embodiment, the navigation module 102 includes (or is in communication with) a Global Positioning System (GPS) device 108. The GPS device 108 is configured to communicate with one or more high-orbit GPS satellites that are in the line of sight of the spacesuit 101 and determine a relative position of the spacesuit 101 in space in relation to the GPS satellites based on communication with the satellites. The navigation module 102 receives the relative position information from the GPS device 108 and the navigation module 102 determines the location of the spacesuit 101 in relation to a fixed reference point on the corresponding spacecraft based on the information received form the GPS device.

According to another embodiment, the navigation module 102 includes (or is in communication with) a Wi-Fi positioning system (WPS) 108 that is configured to determine a relative position of the spacesuit 101 in space in relation to a wireless access point, for example a wireless access point on the corresponding spacecraft, based on communication with the wireless access point. The navigation module 102 receives information from the WPS 108 and determines the location of the spacesuit 101 in relation to a fixed reference point on the corresponding spacecraft based on the received information. According to other embodiments, the navigation module 102 may include (or be in communication with) any type of system that is capable of assisting the navigation module 102 in determining the position of the spacesuit 101 in relation to a fixed reference point. For example, in other embodiments, the navigation module 102 may include (or be in communication with) a Kinect sensor manufactured by the Microsoft Corporation of Redmond, Wash., a Project Tango sensor manufactured by Google Inc. of Mountain View, Calif., a LIDAR or RADAR/Doppler based velocimeter, or another appropriate type of sensor.

According to one embodiment, the navigation module 102 is configured to begin continuously identifying the position of the spacesuit 101 relative to a fixed reference point on a corresponding spacecraft, for example as discussed above with respect to block 207, in response to the system 100 entering "Self-Return" mode. According to another embodiment, the navigation module 102 is configured to continuously identify the relative position of the spacesuit 101 the entire time the associated crewmember is performing an EVA (even when the system 100 is not in "Self-Return" mode).

According to at least one embodiment, upon the system 100 entering "Self-Return" mode, at block 208, the navigation module 102 determines whether the spacesuit 101 is tumbling, for example at an open rotation rate. According to one embodiment, the navigation module determines whether the spacesuit 101 is tumbling (in relation to the fixed reference point) by receiving spacesuit rotation information from a rate gyroscope 108 located in the propulsive backpack system 112. In other embodiments, the navigation module 102 determines whether the spacesuit 101 is tumbling by receiving spacesuit rotation information from one or more other sensor(s) 108 in (or in communication with) the system 100. Upon identifying that the spacesuit 101 is tumbling at a rotation rate, the navigation module 102 instructs the control module 106 to operate the jet pack 112 so that the rotation rate of the spacesuit 101 is nulled. For example, in response to receiving instructions from the navigation module 102, the control module 106 of the system 100 sends control signals to the avionics sub-system 113 of the jet pack 112 so that the avionics sub-system 113 operates the thrusters 115 of the jet pack 112 to null the rotation rate of the spacesuit 101. According to at least one other embodiment, the system 100 does not operate to stabilize the attitude of the suit 101 (as discussed above with respect to block 208), but instead passes directly from block 206 to block 210.

At block 210, the navigation module 102 provides the current position of the spacesuit 101 in relation to the fixed point on the corresponding spacecraft (identified in block 207) to the guidance module 104. The guidance module 104, at block 212, computes a trajectory to return the spacesuit 101 to the fixed reference point on the corresponding spacecraft. According to one embodiment, the guidance module 104 is also configured to account for at least one predefined constraint while computing the trajectory to return the spacesuit 101 to the fixed reference point. For example, while computing the trajectory, the guidance module 104 may take into account such static variables as the volumetric envelope of the suited crewmember, the geometry of the corresponding spacecraft, safety requirements, external clearance requirements, or any predefined variable that may have an impact on the computed trajectory to return the spacesuit 101 to the fixed reference point. The guidance module 104 may also take into account at least one dynamic variable while computing the trajectory. For example, the guidance module make take into account time, the amount of fuel remaining in the propulsive backpack system 112, the amount of oxygen remaining in the suit 101, or any other appropriate variable. According to one embodiment, the guidance module 104 operates the Rendezvous and Proximity Operations Program (RPOP) developed by the National Aeronautics and Space Administration (NASA); however, in other embodiments, the guidance module 104 may operate another appropriate guidance system.

According to one embodiment, at block 214, the trajectory computed by the guidance module 104 is provided to the control module 106. The control module 106 instructs the avionics sub-system 113 of the jet pack 112, via the interface 117, to control the thrusters 115 of the jet pack 112 so that the jet pack 112 (and attached spacesuit 101) moves, according to the computed trajectory, back to the fixed location on the corresponding spacecraft.

According to another embodiment, at block 216, the trajectory computed by the guidance module 104 is provided to the output module 107 and the output module 107 provides a directional cue, for example a visual cue such as an arrow, to the crewmember via a display that identifies in which direction the crewmember should operate the controls 109 of the jet pack 112 (at block 218) such that the suit 101 is propelled back to the fixed location along the computed trajectory. In other embodiments, the output module 107 may be configured to provide another type of directional cue, for example an audible or tactile based cue, to the crewmember that identifies in which direction the crewmember should operate the controls 109 of the jet pack 112 (at block 218) such that the suit 101 is propelled back to the fixed location along the computed trajectory.

According to one embodiment, while the control module 106 of the system 100 is instructing the avionics sub-system 113 of the jet pack or the crewmember is operating the controls 109 of the jet pack 112 based on a displayed trajectory, the navigation module 102 and guidance module 104 continue to operate, as discussed above, to update the location information of the spacesuit 101 in relation to the fixed location on the spacecraft and update the computed trajectory based on the updated location information from the navigation module 102. In one embodiment, the updated trajectory information is continuously provided to the control module 106 so that the control module 106 is instructing the avionics sub-system 113 of the jet pack based on the most up-to-date location/trajectory information. The control module 106 operates the jet pack 112 until the spacesuit 101 is safely returned to the fixed location of the corresponding spacecraft. In another embodiment, the updated trajectory information is continuously provided to the output module 107 so that the directional cue provided by the output module to the crewmember is based on the most up-to-date location/trajectory information. The output module 107 continues to provide the directional cue to the crewmember until the spacesuit 101 is safely returned to the fixed location of the corresponding spacecraft.

Figure 3:
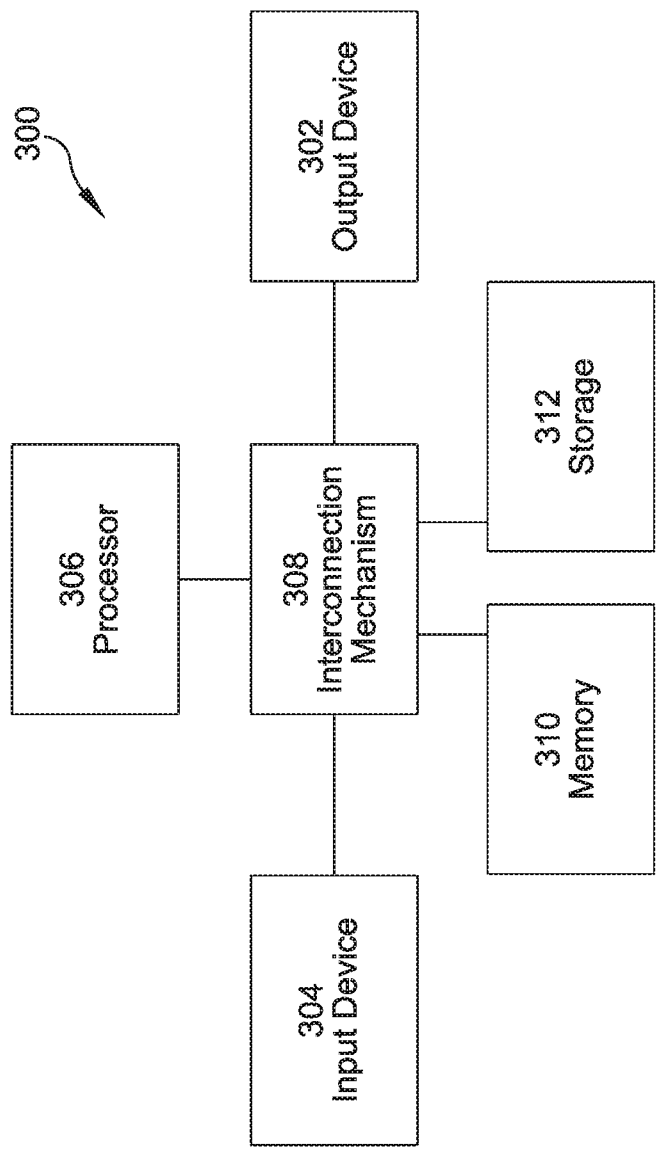
FIG. 3 is a block diagram of a system upon which various embodiments may be implemented.

FIG. 3 illustrates an example block diagram of computing components forming a system 300 which may be configured to implement one or more aspects disclosed herein. For example, the system 300 may be coupled to the system 100, included within the system 100, configured to operate the system 100, included within any one of the navigation module 102, the guidance module 104, or the control module 106, coupled to any one of the navigation module 102, the guidance module 104, or the control module 106, or configured to operate any one of the navigation module 102, the guidance module 104, or the control module 106. The system 300 may also be configured to operate an assisted EVA self-return system as discussed above.

The system 300 may include for example a computing platform such as those based on Intel PENTIUM-type processor, Motorola PowerPC, Sun UltraSPARC, Texas Instruments-DSP, Hewlett-Packard PA-RISC processors, or any other type of processor. According to at least one embodiment the system 300 includes a computing platform based on a processor that is qualified for use and operations in space, for example, a SP0 3U CompactPCI Radiation Tolerant PowerPC SBC manufactured by Aitech Defense Systems, Inc. of Chatsworth, Calif. System 300 may include specially-programmed, special-purpose hardware, for example, an application-specific integrated circuit (ASIC). Various aspects of the present disclosure may be implemented as specialized software executing on the system 300 such as that shown in FIG. 3.

The system 300 may include a processor/ASIC 306 connected to one or more memory devices 310, such as a disk drive, memory, flash memory or other device for storing data. Memory 310 may be used for storing programs and data during operation of the system 300. Components of the computer system 300 may be coupled by an interconnection mechanism 308, which may include one or more buses, for example between components that are integrated within a same machine, and/or a network, for example between components that reside on separate machines. The interconnection mechanism 308 enables communications, for example data and/or instructions, to be exchanged between components of the system 300. The interconnection mechanism 308 can operate as an Analog to Digital Converter or a Digital to Analog Converter, between components of the system 300. The system 300 also includes one or more input devices 304, which may include for example, a keyboard, a touch screen, a hand controller, a voice recognition system, a gesture interface, etc. The system 300 includes one or more output devices 302, which may include for example a visual display, a heads up display, a near-eye display, an augmented reality display, an auditory output device, a tactile output device, etc. In addition, the computer system 300 may contain one or more interfaces (not shown) that may connect the computer system 300 to a communication network, in addition or as an alternative to the interconnection mechanism 308.

The system 300 may include a storage system 312, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 310 that allows for faster access to the information by the processor/ASIC than does the medium. This memory 310 may be a volatile, random access memory such as a dynamic random access memory (DRAM) or static memory (SRAM). It may be located in storage system 312 or in memory system 310. The processor 306 may manipulate the data within the integrated circuit memory 310 and then copy the data to the storage 312 after processing is completed. A variety of mechanisms are known for managing data movement between storage 312 and the integrated circuit memory element 310, and the disclosure is not limited thereto. The disclosure is not limited to a particular memory system 310 or a storage system 312.

The system 300 may include a computer platform that is programmable using a high-level computer programming language. The system 300 may be also implemented using specially programmed, special purpose hardware, for example an ASIC. The system 300 may include a processor 306, which may be a commercially available processor such as the well-known Pentium class processor available from the Intel Corporation. Many other processors are available. The processor 306 may execute an operating system which may be, for example, a Real Time Operating System (RTOS). In other embodiments, the operating system may be a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As discussed above, the EVA self-return system may be implemented in a spacesuit of a crewmember performing a spacewalk around a spacecraft; however, in other embodiments, the EVA self-return system may be implemented in a spacesuit of a crewmember performing some other function where the risk of becoming incapacitated or disoriented is relatively high, for example in exploring a planet or asteroid, and it would be beneficial to have a system to assist in returning the crewmember to a safe location in case of an emergency, for example through automatic activation of a corresponding propulsive backpack system or by providing directional cues to enable the crewmember to manually perform safe return trajectory maneuvers.

As also discussed above, the EVA self-return system is implemented in a spacesuit of a crewmember operating in space; however, in other embodiments, the EVA self-return system may be implemented in another type of suit, for example a terrestrial based suit, of a crewmember that is operating apart from a vehicle and that may benefit from having a system to assist in returning the crewmember to a vehicle or safe location if the crewmember becomes incapacitated. For example, the EVA self-return system may be implemented in an underwater diver's suit and be configured to assist in returning the diver to a boat or a submersible if the diver becomes incapacitated or disoriented. In another embodiment, the EVA self-return system may be implemented in the suit of a free-falling skydiver and be configured to assist the sky diver in controlling her freefall to land in a desired location if the skydiver became disoriented. In other embodiments, the EVA self-return system may be implemented in the suit of a firefighter, a mine worker, a cave explorer, or in any type of suit where the EVA self-return system could assist a crewmember in reaching a fixed location when the crewmember has become incapacitated or disoriented.

As discussed above, the EVA self-return system operates to return a crewmember to a vehicle if the crewmember becomes incapacitated; however, in other embodiments, the EVA self-return system can be utilized to a return a crewmember to a vehicle even if the crewmember is not incapacitated. For example, the crewmember may initiate the "Self-Return" mode of the system manually, for example via user controls of a corresponding suit, so that the system operates the suit or corresponding thruster system to assist in returning the suit to a vehicle or safe location via a computed trajectory in real-time.

As discussed above, the guidance module of the EVA self-return system operates to calculate a trajectory to return a spacesuit to a fixed reference point on a corresponding spacecraft based on a set of parameters (e.g., static and/or dynamic parameters). However, in at least one embodiment, the guidance module calculates a trajectory based on the shortest path back to the fixed location (even if the trajectory passes through a structure). In another embodiment, the guidance module calculates a trajectory based on the shortest path back to the fixed location that is traverse on or along the corresponding spacecraft's structure. In other embodiments, the guidance module may be configured to calculate the trajectory in another appropriate way.

A system and method for EVA self-return is provided herein. The navigation module of the system automatically estimates a crewmembers navigation state relative to a fixed location on an accompanying orbiting spacecraft based on data from one or more sensors, the guidance module of the system computes a guidance trajectory for returning the crewmember to that fixed location. In at least one embodiment, the system actuates the crewmember's propulsive jetpack to follow the prescribed trajectory back to the spacecraft. The system may be activated manually by the crewmember or remotely. In another embodiment, the system provides the crewmember with a directional cue, for example a visual, auditory, or tactile cue, corresponding to the prescribed trajectory back to the fixed location. The EVA self-return system operates (via operation of a propulsive jetpack or by providing directional cues) to assist in returning the potentially incapacitated crewmember to the spacecraft safely via a computed trajectory.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An EVA self-return system comprising:
a sensor configured to monitor a parameter of a suit;
a navigation module in communication with the sensor, the navigation module configured to identify, based on parameter information received from the sensor, a current location of the suit in relation to a fixed reference point;
a guidance module in communication with the navigation module, the guidance module configured to receive, in a self-return mode of operation, an indication of the current location of the suit from the navigation module and to compute, in the self-return mode of operation, a trajectory from the current location of the suit to the fixed reference point;
an interface configured to be in communication with a propulsive system; and
a control module in communication with the guidance module and configured to be in communication with the propulsive system via the interface, the control module further configured to transmit, in the self-return mode of operation, instructions to the propulsive system to operate the propulsive system to propel the suit to the fixed reference point along the trajectory received from the guidance module,
wherein the navigation module is in further communication with the control module and is further configured to:
communicate with a suit system;
initiate the self-return mode of operation in response to receiving a signal from the suit system;
determine, in response to initiating the self-return mode of operation, based on the parameter information received from the sensor, whether the suit is tumbling; and
in response to determining that the suit is tumbling, instruct the control module to transmit instructions to the propulsive system that are configured to operate the propulsive system such that the tumbling of the suit is nulled.

2. The EVA self-return system of claim 1, wherein the sensor comprises a gyroscope configured to monitor angular movement of the suit.

3. The EVA self-return system of claim 1, wherein the sensor comprises an accelerometer configured to monitor linear acceleration of the suit.

4. The EVA self-return system of claim 1, wherein the sensor comprises a vision+inertial sensor configured to measure angular movement of the suit, measure linear acceleration of the suit, capture visual images within a field of view of the vision+inertial sensor, and compensate the measured angular movement of the suit and the measured linear acceleration of the suit for drift based on the captured visual images.

5. The EVA self-return system of claim 1, wherein the sensor comprises a Global Positioning System (GPS) device configured to communicate with satellites within a line of sight of the GPS device and determine a relative position of the suit based on the communication with the satellites.

6. The EVA self-return system of claim 1, wherein the sensor comprises a Wi-Fi positioning system (WPS) configured to determine a relative position of the suit based on communication with a wireless access point.

7. The EVA self-return system of claim 1, wherein the sensor comprises a star tracker system configured to capture visual images of objects within a field of view of the star tracker system, compare the captured visual images of the objects to images of the objects previously stored in a database, and determine a relative position of the suit based on the comparison of the captured visual images of the objects to the previously stored images of the objects.

8. The EVA self-return system of claim 1, wherein the suit system is a user control system and the navigation module is further configured to initiate the self-return mode of operation in response to receiving the signal from the user control system.

9. The EVA self-return system of claim 1, wherein the suit system is a communications system and the navigation module is further configured to initiate the self-return mode of operation in response to receiving the signal from the communications system.

10. The EVA self-return system of claim 1, wherein the suit system is a biomedical monitoring system and the navigation module is further configured to initiate the self-return mode of operation in response to receiving the signal from the biomedical monitoring system.

11. The EVA self-return system of claim 1, wherein in computing the trajectory from the current location of the suit to the fixed reference point, the guidance module is further configured to account for a predefined constraint.

12. The EVA self-return system of claim 11, wherein the predefined constraint includes at least one of a volumetric envelope of the suit, a safety requirement, an external clearance requirement, and a geometry of a vehicle including the fixed reference point.

13. The EVA self-return system of claim 1, wherein in computing the trajectory from the current location of the suit to the fixed reference point, the guidance module is further configured to account for a dynamic variable.

14. The EVA self-return system of claim 13, wherein the dynamic variable includes at least one of a remaining amount of fuel in the propulsive system and a remaining amount of oxygen in the suit.

15. The EVA self-return system of claim 1, wherein the propulsive system is a Simplified Aid for EVA Rescue (SAFER) system and the control module is further configured to transmit, in the self-return mode of operation, the instructions to the SAFER system via the interface.

16. A method for EVA self-return, the method comprising:
monitoring a parameter of a suit;
continuously identifying, with a navigation module based on the monitored parameter information, a current location of the suit in relation to the fixed reference point;
initiating, in response to receiving a signal from a suit system, a self-return mode of operation;
computing, in the self-return mode of operation with a guidance module, a trajectory from the current location of the suit to the fixed reference point;
transmitting, in the self-return mode of operation with a control module, instructions to a propulsive system coupled to the suit, the instructions configured to operate the propulsive system to propel the suit to the fixed reference point along the trajectory received from the guidance module;
determining, in response to initiating the self-return mode of operation, with the navigation module based on the monitored parameter information, whether the suit is tumbling; and
in response to determining that the suit is tumbling, instructing, with the navigation module, the control module to transmit instructions to the propulsive system to operate the propulsive system such that the tumbling of the suit is nulled.

17. The method of claim 16, wherein computing the trajectory includes computing the trajectory from the current location of the suit to the fixed reference point while accounting for at least one predefined constraint.

* * * * *